March 4, 1969 A. F. GRANT ET AL 3,430,585
MATERIAL HANDLING PALLET
Filed Oct. 25, 1967
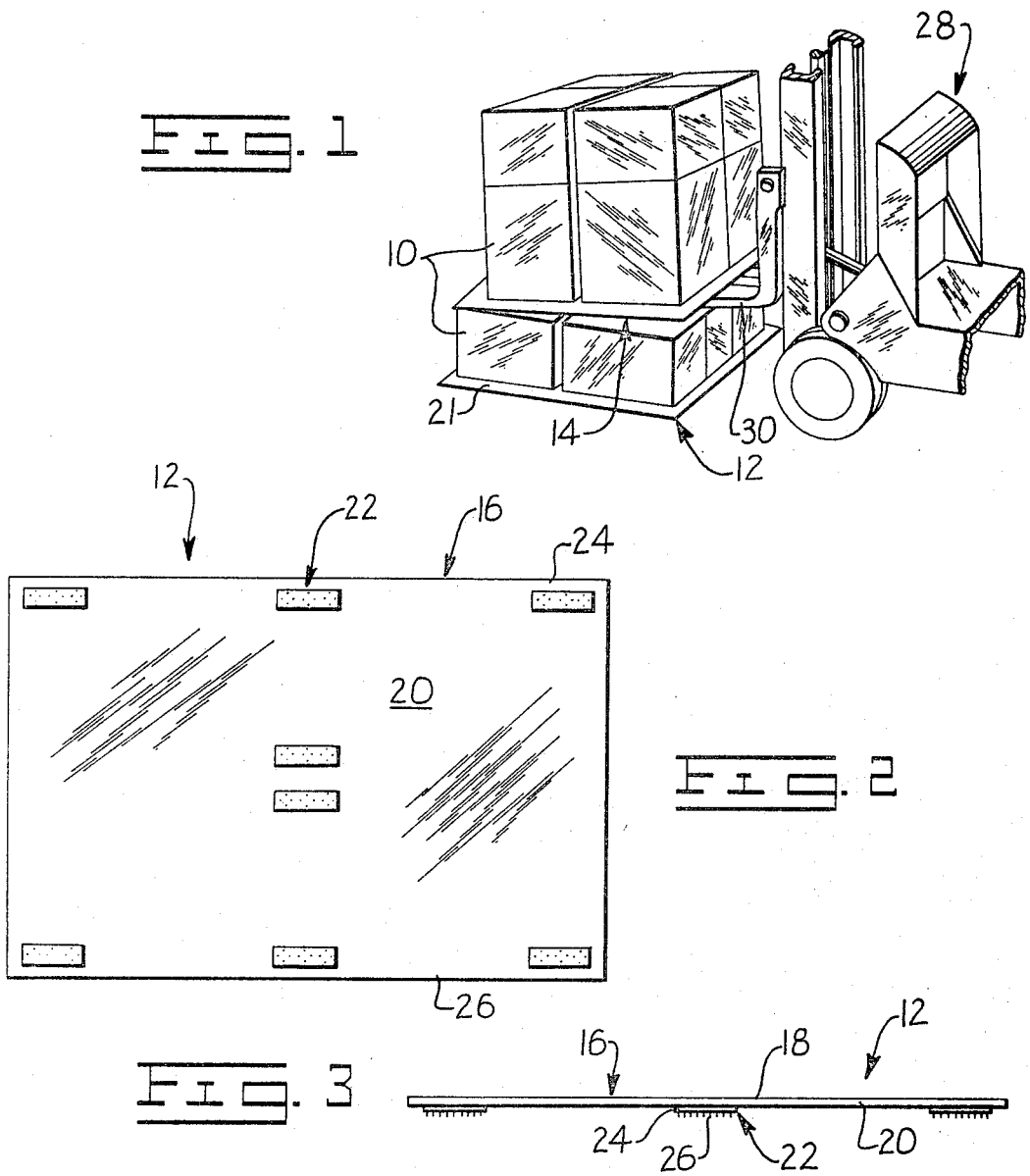
INVENTORS
ARTHUR F. GRANT
ROBERT G. EGGERS
BY
ATTORNEYS

3,430,585
MATERIAL HANDLING PALLET

Arthur F. Grant, East Cleveland, and Robert G. Eggers, Eastlake, Ohio, assignors to Towmotor Corporation, Cleveland, Ohio, a corporation of Ohio
Filed Oct. 25, 1967, Ser. No. 678,074
U.S. Cl. 108—51                              1 Claim
Int. Cl. B65d *19/00, 19/38*

ABSTRACT OF THE DISCLOSURE

A material handling pallet providing a support sheet having a topside for receiving material to be handled and an underside, a plurality of elevator members being secured to the underside for maintaining the sheet in a raised position from a supporting surface and to enable insertion thereunder of lift forks.

---

Material handling pallets such as are known in the prior art are usually constructed of wood or corrugated paper board and are employed to facilitate the pickup and discharge of loads of material. A pallet of the known type may be put into use at an initial loading point, and maintained in use through a plurality of successive material handling operations. The loaded pallet is usually moved from one position to another by means of a forklift truck.

The known pallets have presented problems with respect to their movement by the lift forks. During insertion of lift forks under any of the known pallets, damage has frequently been caused to the pallet. As a further problem, the pallet has frequently been subject to slippage during pickup or deposit thereof by lift forks.

Various devices have been employed for overcoming the above discussed disadvantages of the prior art. Such devices have included lift fork attachments, such as rubber grippers or suction members. Such devices have often been impractical for use with some types of materials being handled. In addition, such devices have been of complex structure and uneconomical.

The present invention provides a material handling pallet which overcomes the above discussed disadvantages of the prior art. The advantages of the present invention will become apparent from the following description, when read in conjunction with the accompanying drawings, in which:

FIGURE 1 is a perspective view of a stack of cartons supported by pallets constructed in accordance with the invention, a lift fork truck being shown in operative position;

FIGURE 2 is an enlarged bottom plan view of one of the pallets of FIGURE 1;

FIGURE 3 is a side-elevational view of the pallet of FIGURE 2; and

FIGURE 4 is a further enlarged fragmentary cross-sectional view of the pallet of FIGURES 2–3.

In FIGURE 1 there is shown a stack of cartons 10, such as might be found in a warehouse. Some of the cartons 10 are supported on a pallet 12 of the invention, which pallet may rest on a supporting surface such as a warehouse floor. The remainder of the cartons 10 are supported on a pallet 14 of the invention, which pallet rests on the top surface presented by the first-mentioned cartons.

Each of the pallets 12 and 14 is constructed of a sheet 16 (see also FIGURES 2 and 3) having a topside 18 and an underside 20. The sheet 16 may be constructed of any suitable material, and is preferably composed of heavy cardboard approximately ⅛ inch thick. The sheet 16 may for example be approximately 4½ feet long and approximately 3 feet wide. The dimensions are such that a marginal portion 21 extends beyond each of the side surfaces presented by the cartons 10.

Adhesively bonded to the underside 20 of the sheet are a plurality of elevator members 22 in the form of friction pads. Two of the members 22 are positioned at the center, while three of the members 22 are positioned along each of the opposite side edges 24, 26 of the sheet. The members 22 may be of rubber, or of other suitable material presenting a friction surface. Each of the pads 22 preferably provides a base portion 24 (see FIGURES 3 and 4) and a plurality of tapered pins 26 projecting from the base portion. The base portion is preferably approximately .06 inch thick and the overall height of the member 22 is preferably approximately 0.4 inch. When the pallet bearing the cartons 10 is placed on a supporting surface, the pins 26 bend in random fashion presenting a friction surface consisting of deformed pins.

When it is desired to move the loaded pallet, a conventional lift fork truck 28 having forks 30 may be employed in the manner shown in FIGURE 1. The frictional surfaces presented by the members 22 serve to maintain the pallet against slipping with respect to the supporting surface. The insertion of the forks 30 under the sheet is facilitated by the marginal portion 21 and by the slight elevation of the sheet caused by the members 22. The positioning of the members 22 is such as to avoid possible interference with the forks as they are inserted. The frictional drag load between the forks and the pallet is minimized by the elevated position of the sheet 16, so that the pallet will not slip during the loading operation. Also minimized is the danger of damage to the pallet by the inserted forks 30. After the forks 30 have been inserted and the sheet 16 tilted into the position shown in FIGURE 1, the members 22 adjacent the rearward edge of the pallet exert increased resistance to sliding and thus aid further insertion of the forks.

The members 22 serve to facilitate an unloading operation, in which the loaded pallet is deposited by the truck in a new position. The pallet is then maintained in the desired deposit position during retracton of the forks 30 thereform. The members 22 also serve the advantage of makng it possible to employ lifting machines which are relatively versatile, and which can perform other conventional lifting operations in addition to the handling of the pallets.

The number of members 22 and their relative positioning may be varied to meet the needs of particular material handling operations.

The frictional drag load can be further minimized by highly polishing the surfaces of the forks 30.

We claim:

1. A material handling pallet which consists substantially entirely of a sheet of cardboard approximately one-eighth inch thick and having a plurality of spaced pads of rubber-like material adhesively secured to its under surface to hold it at an elevation just sufficient to admit the tines of a lift fork beneath it, said pads having downwardly projecting bendable pins to present slipping over the surface upon which they rest.

References Cited

UNITED STATES PATENTS

| 1,973,226 | 9/1934  | Rose, et al.  | 248—188.9 |
| 2,301,420 | 11/1942 | Liabastre     | 248—188.9 |
| 3,104,085 | 9/1963  | Skladany      | 108—51 XR |
| 2,372,055 | 3/1945  | Braun         | 108—58    |
| 3,251,322 | 5/1966  | Downs et al.  | 108—58    |
| 3,275,131 | 9/1966  | Erickson.     |           |
| 3,333,805 | 8/1967  | Marshall      | 248—188.9 |
| 3,365,221 | 1/1968  | Jureit        | 248—246 XR |

JAMES T. McCALL, *Primary Examiner.*

G. O. FINCH, *Assistant Examiner.*

U.S. Cl. X.R.

108—58